G. W. MARCHANT & C. B. BURCH.
AUTOMOBILE WHEEL ANCHOR.
APPLICATION FILED FEB. 28, 1916.
1,215,395.
Patented Feb. 13, 1917.
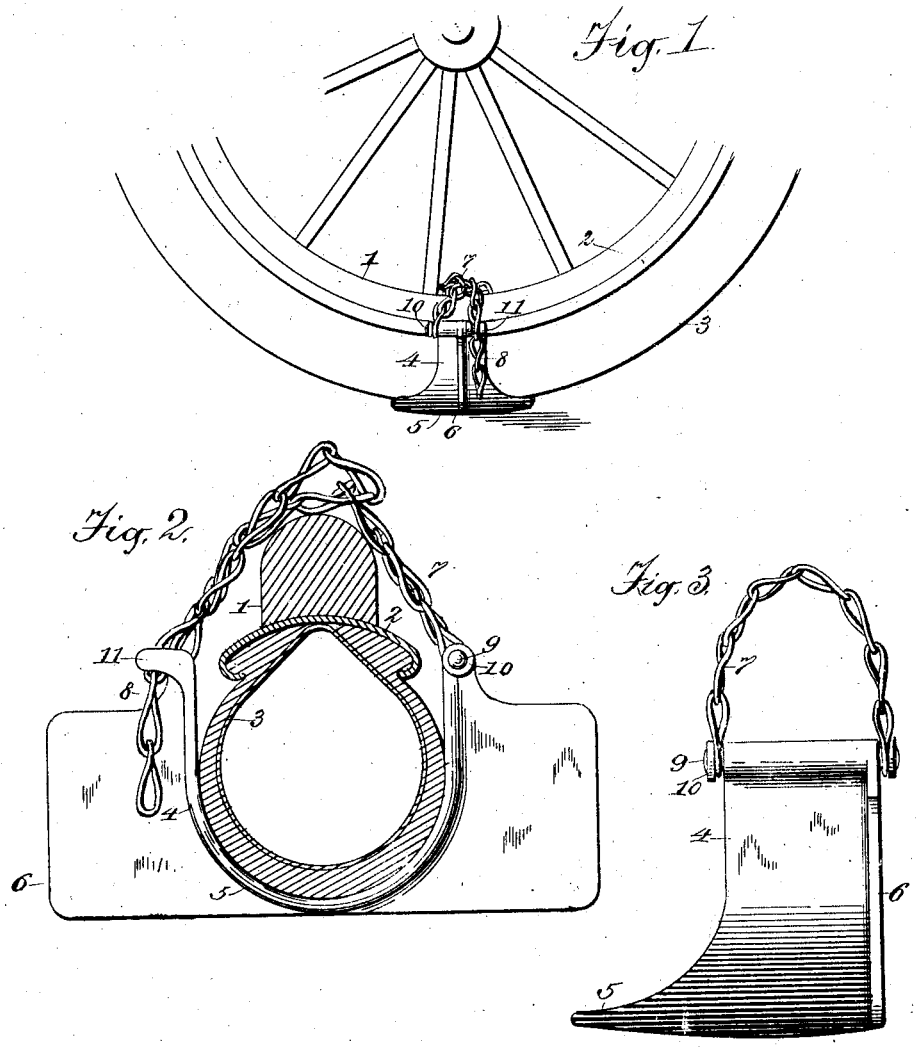

UNITED STATES PATENT OFFICE.

GEORGE W. MARCHANT AND CHARLES B. BURCH, OF MARION, IOWA.

AUTOMOBILE-WHEEL ANCHOR.

1,215,395.

Specification of Letters Patent.

Patented Feb. 13, 1917.

Application filed February 26, 1916. Serial No. 80,804.

*To all whom it may concern:*

Be it known that we, GEORGE W. MARCHANT and CHARLES B. BURCH, citizens of the United States, residing at Marion, in the county of Linn and State of Iowa, have invented certain new and useful Improvements in Automobile-Wheel Anchors; and we do hereby declare the following to be a full, clear, and exact description of the invention, such as will enable others skilled in the art to which it appertains to make and use the same.

This invention relates more particularly to automobiles and motor trucks, and has for its object to provide convenient and efficient means for extricating the wheels of such vehicles from mud and sand.

The invention is fully set forth in the description and claim following, reference being had to the accompanying drawing, in which—

Figure 1 is a side view of my improved anchor as applied to an automobile wheel. Fig. 2 is a view of the same from the front or rear, the wheel being in section. Fig. 3 is a side view of a modified form of the device.

In the drawing, 1 denotes the felly, 2 the clencher rim, and 3 the tire of an automobile wheel. The anchor comprises a stirrup-shaped shoe 4 having a broad base 5 conforming practically to the curvatures of the tire. From the sides of the stirrup extend broad wings 6, which, as the wheel turns are forced into the soft earth and by their lateral anchorage therein secure a firm enough grip to carry the automobile out of the mud-hole or pocket of soft sand. In practice it is preferred to make the bottom edges of these wings practically flush with the bottom of the stirrup, since it may be desirable in some cases to leave the anchor on the tire over considerable stretches of road, where a hard smooth roadway might be frequently interrupted by soft spots, and in such cases the anchor does not affect the smoothness of riding over the hard part of the road. The anchor is attached in a moment to the wheel by a pair of chains, 7 and 8. The former is a simple loop, as best shown in Fig. 3, and may be secured at each end to lateral studs 9 at the upper ends of the stirrup, as by washers 10. The other chain is attached similarly at one end, leaving the other end free to pass about the loop, and when drawn taut to connect suitably with the stirrup, as by drawing a link between a pair of outstanding lugs 11. This fastening is of course more conveniently made on the outer than the inner side of the wheel. If the wings are placed central to the stirrup but one type of anchor need be made, but if set on the forward side, as shown in Fig. 3, rights and lefts would be required. In either case there should be a broad base, so that the twisting strain on the anchor does not result in cutting or injuring the tire. Slip, beyond a limited distance, is prevented by a spoke of the wheel, as indicated in Fig. 1.

Referring to Fig. 2, it will be seen that the legs of the stirrup extend upwardly to straddle a part of the wheel rim, the part so straddled being the clencher bead, in the type of wheel herein illustrated. This serves in part as a protection to the tire, either in skidding, when lateral pressure is exerted on the shoe, or whenever the twisting strain might be sufficient to partially displace the shoe at the tread, as, for example, when the wheel is in a rut, with one wing of the shoe caught on a stone or tree root, and the other free. It will be evident also that the wings serve to brace and stiffen the legs of the stirrup, where such stiffening is specially needed. Otherwise, since the stirrup is not flexible, and is made wide enough to slip over the inflated tire, a powerful traction strain would tend to collapse the legs so they would not slip on or off, and a twisting strain might spread them injuriously. This collapsing at the base is prevented in part by its circumferential length, and in part by its doubly concavo-convex form.

Having thus described our invention, we claim:

A wheel anchor shoe, comprising a traction stirrup adapted to straddle the tire and rim, and an attached fastener therefor, consisting of a loop, as of chain, connecting with the corners of one stirrup leg, and a chain attached to one corner of the other leg, and suitable means at the other corner of said leg to connect with the free end of the chain after passing through said loop.

In testimony whereof we affix our signatures in presence of two witnesses.

GEORGE W. MARCHANT.
CHARLES B. BURCH.

Witnesses:
C. J. HAAS,
E. R. WHITTAKER.